Figure 2:
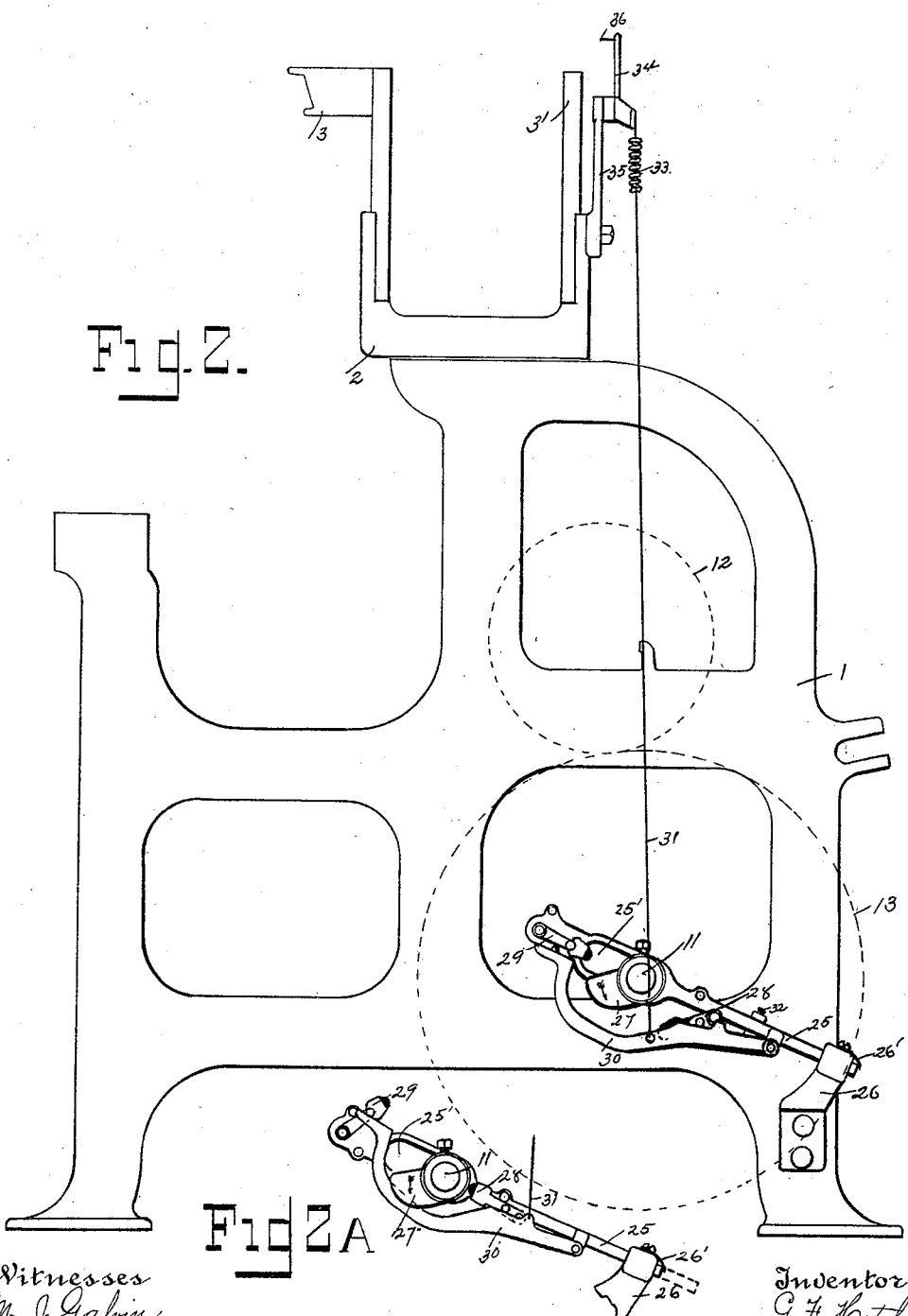

No. 614,390. Patented Nov. 15, 1898.
G. F. HUTCHINS.
SWIVEL LOOM.
(Application filed June 29, 1897.)
(No Model.) 8 Sheets—Sheet 1.
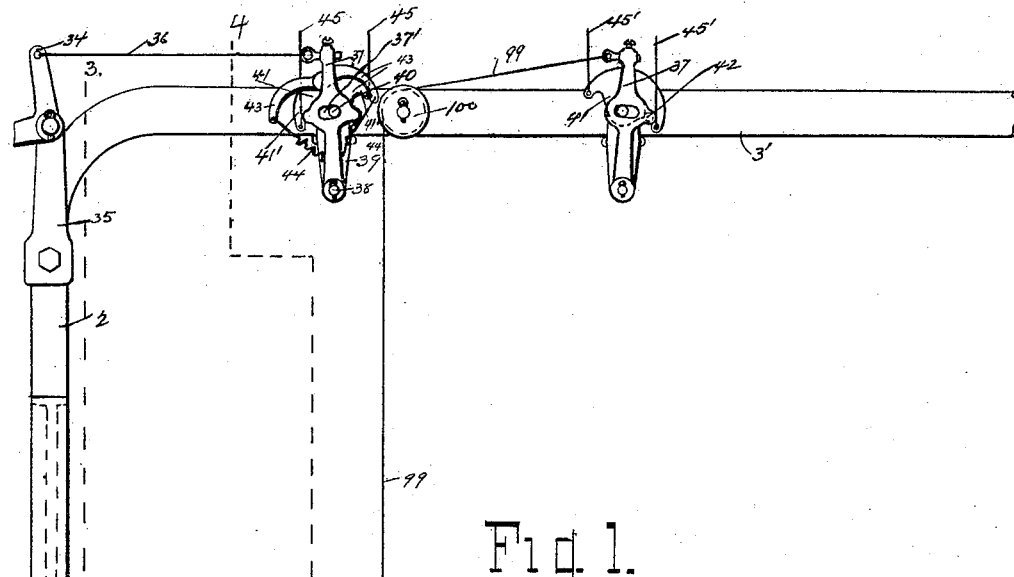
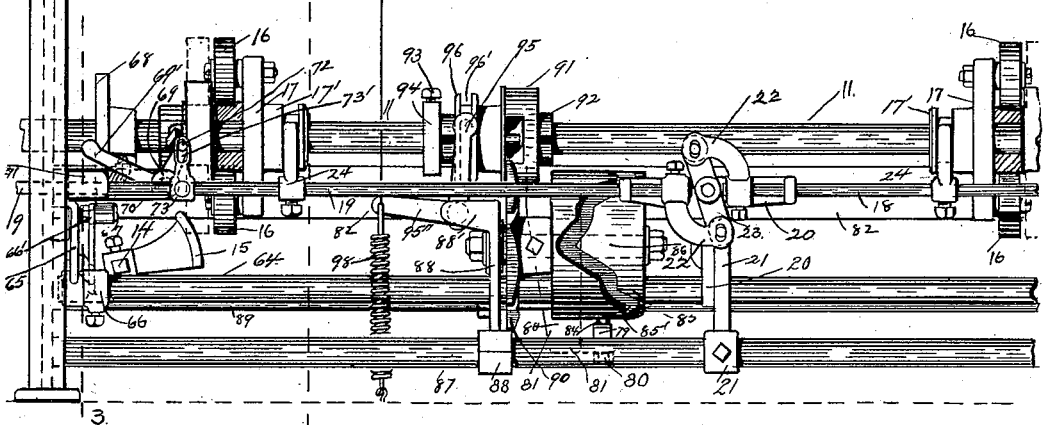
Fig. 1.
Witnesses
M. J. Galvin.
Arthur S. Cowan.
Inventor
G. F. Hutchins
By J. C. Dewey
Attorney
THE NORRIS PETERS CO., PHOTO-LITHO., WASHINGTON, D. C.

No. 614,390. Patented Nov. 15, 1898.
G. F. HUTCHINS.
SWIVEL LOOM.
(Application filed June 29, 1897.)
(No Model.) 8 Sheets—Sheet 4.

Witnesses
M. J. Galvin,
Arthur S. Cowan

Inventor
G. F. Hutchins

By Attorney
J. C. Dewey

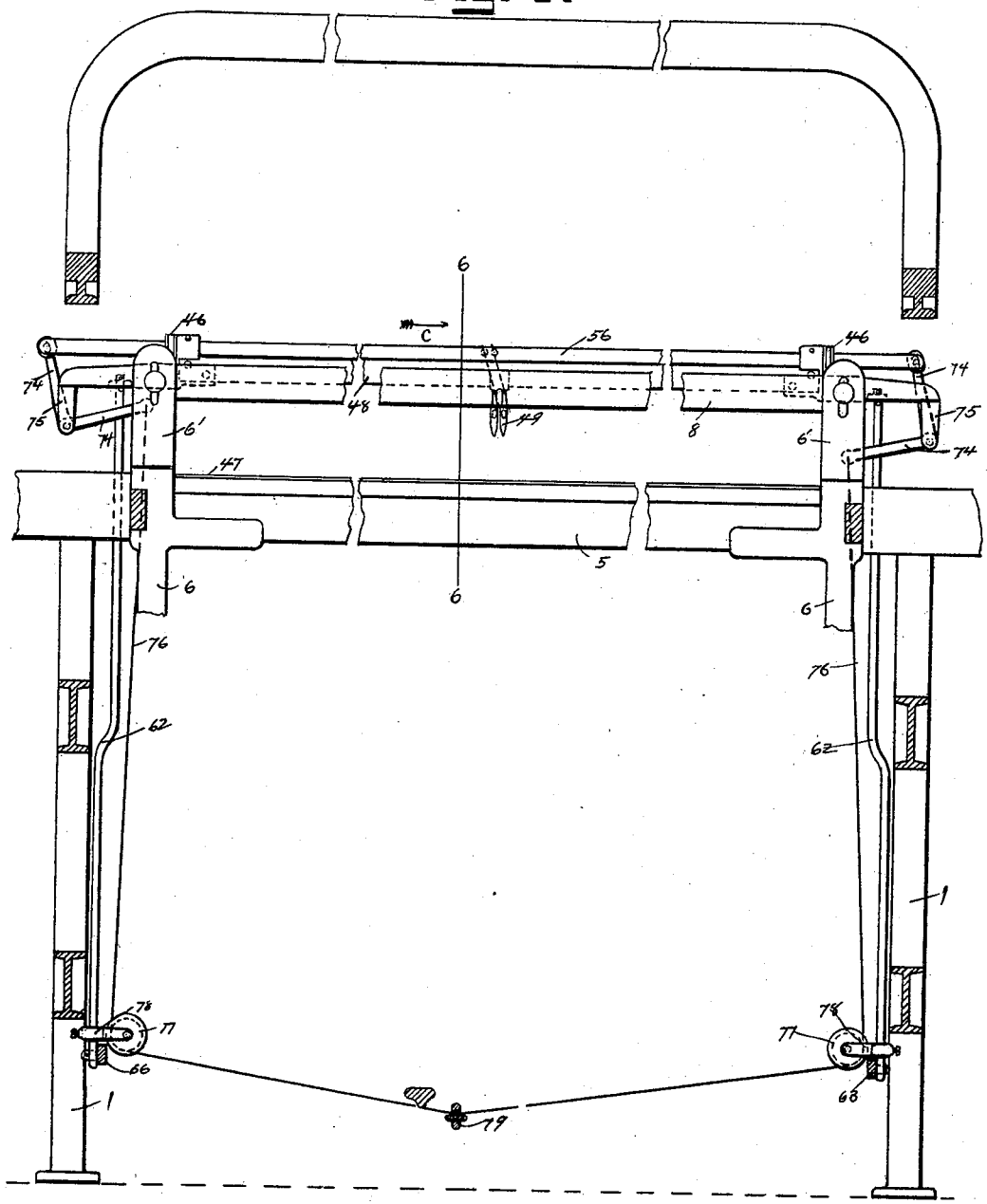

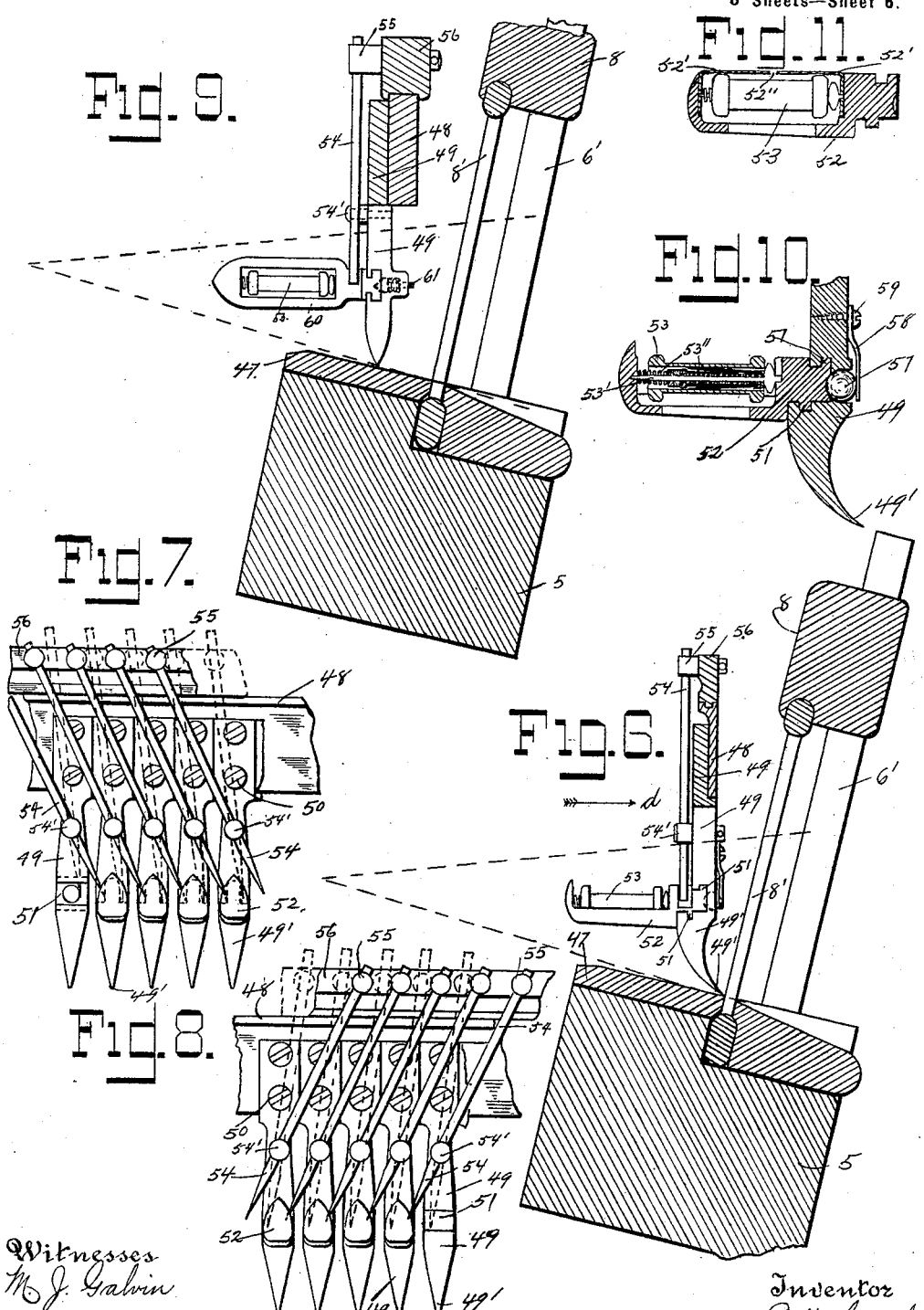
No. 614,390. Patented Nov. 15, 1898.
G. F. HUTCHINS.
SWIVEL LOOM.
(Application filed June 29, 1897.)
(No Model.) 8 Sheets—Sheet 6.

No. 614,390. Patented Nov. 15, 1898.
G. F. HUTCHINS.
SWIVEL LOOM.
(Application filed June 29, 1897.)
(No Model.) 8 Sheets—Sheet 7.
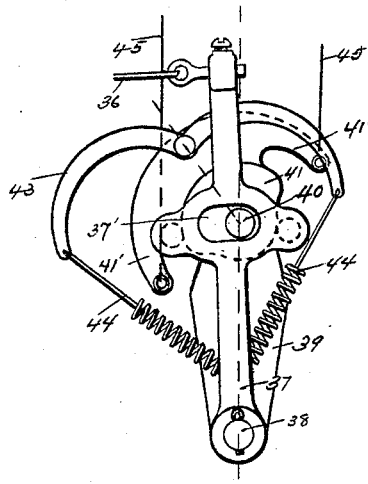
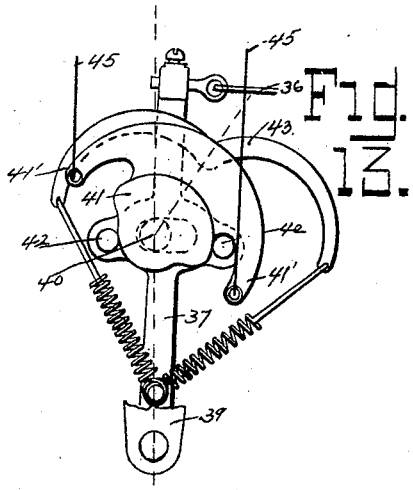
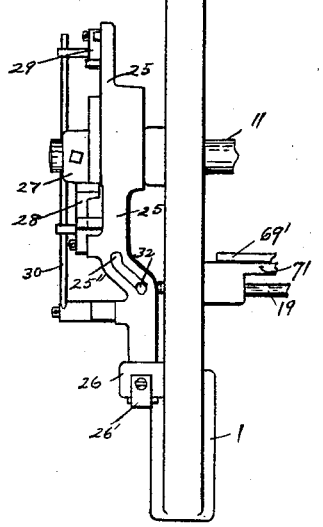
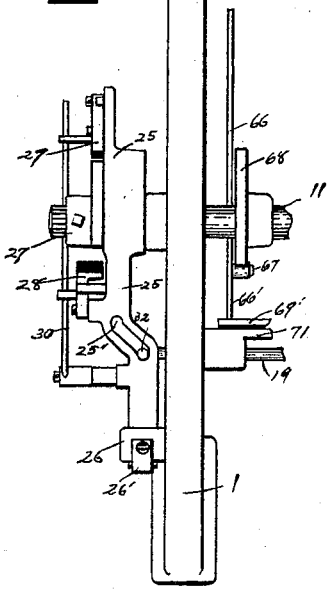
Witnesses
M. J. Galvin.
Arthur S. Cowan.
Inventor
G. F. Hutchins
By Attorney
J. E. Dewey.
THE NORRIS PETERS CO., PHOTO-LITHO., WASHINGTON, D. C.

No. 614,390. Patented Nov. 15, 1898.
G. F. HUTCHINS.
SWIVEL LOOM.
(Application filed June 29, 1897.)
(No Model.) 8 Sheets—Sheet 8.
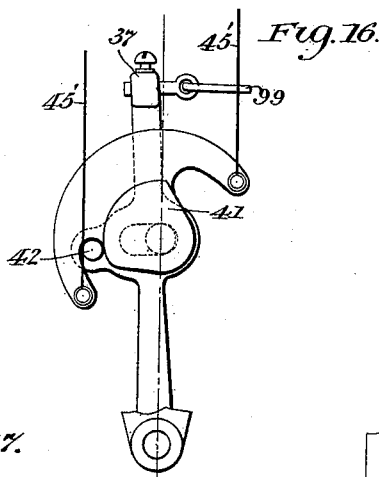
Fig. 16.
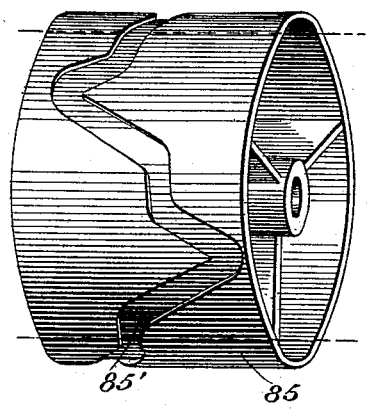
Fig. 17.
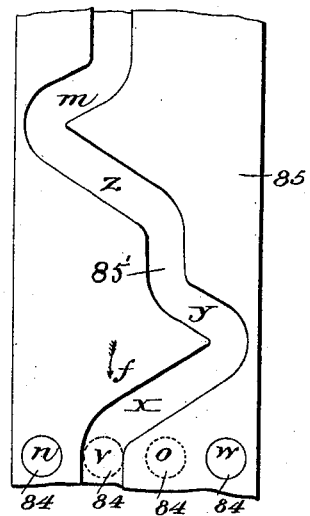
Fig. 18.
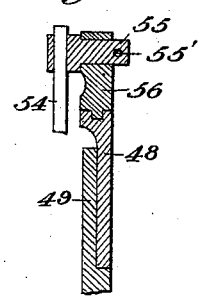
Fig. 6.ª
Witnesses.
M. J. Galvin
Arthur S. Cowan
Inventor.
G. F. Hutchins
By Attorney
John E. Dewey
THE NORRIS PETERS CO., PHOTO-LITHO., WASHINGTON, D. C.

UNITED STATES PATENT OFFICE.

GEORGE F. HUTCHINS, OF WORCESTER, MASSACHUSETTS, ASSIGNOR TO THE CROMPTON & KNOWLES LOOM WORKS, OF SAME PLACE.

SWIVEL-LOOM.

SPECIFICATION forming part of Letters Patent No. 614,390, dated November 15, 1898.

Application filed June 29, 1897. Serial No. 642,851. (No model.)

*To all whom it may concern:*

Be it known that I, GEORGE F. HUTCHINS, a citizen of the United States, residing at Worcester, in the county of Worcester and State of Massachusetts, have invented certain new and useful Improvements in Swivel-Looms, of which the following is a specification.

My invention relates to swivel-looms or looms provided with swivel-shuttle attachments, the swivel-shuttles being used in addition to the ordinary fly-shuttle to make spots or figures on the fabric.

The object of my invention is to improve upon the construction of swivel-looms as now ordinarily made, and more particularly to make a swivel-loom entirely automatic in its operation in which the whole of the warp-threads or any portion of them may be covered by the movement of the swivel-shuttles, so that a figure may be woven covering the entire width of the fabric or only a few threads thereof, as desired. The movement of the swivel-shuttles is entirely automatic, and the time of movement is indicated by the jacquard, so that they may be automatically called at will, both as regards their downward movement into the shed and their side movement across the warp. The fabric may be woven with the embroidery-figure on both sides or on one side only, or partly on one side and partly on both sides, as desired.

My invention consists in certain novel features of construction of a power swivel-loom of the description above referred to, as will be hereinafter fully described.

I have shown in the drawings only sufficient portions of a power-loom having my improvements applied thereto to enable those skilled in the art to understand the construction and operation thereof.

In the drawings I have shown sliding pick mechanism for controlling the action of the fly-shuttle mechanism of substantially the same construction and operation as is shown in my Patent No. 474,170, of May 3, 1892.

Figure 3:
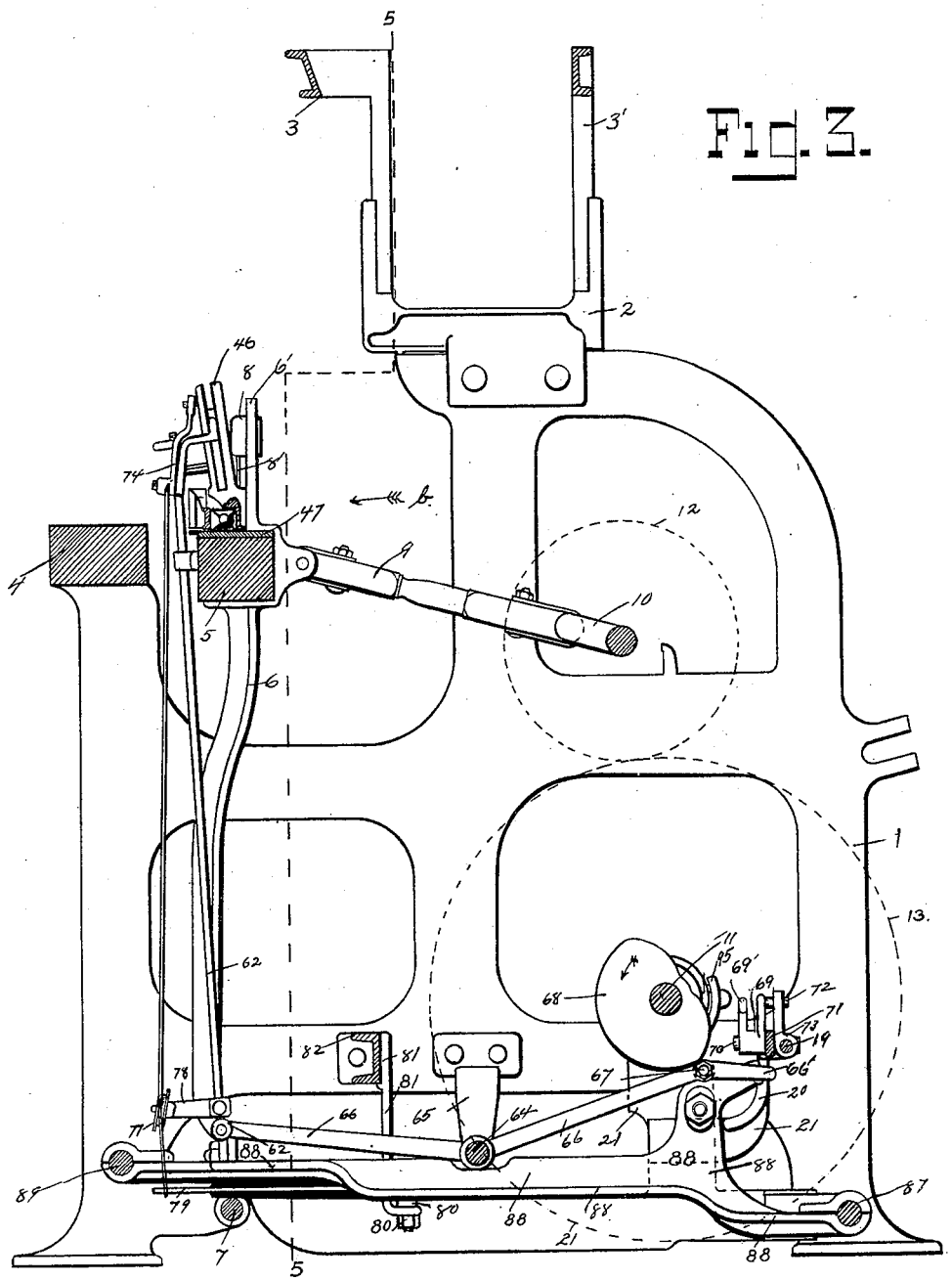
Figure 4:
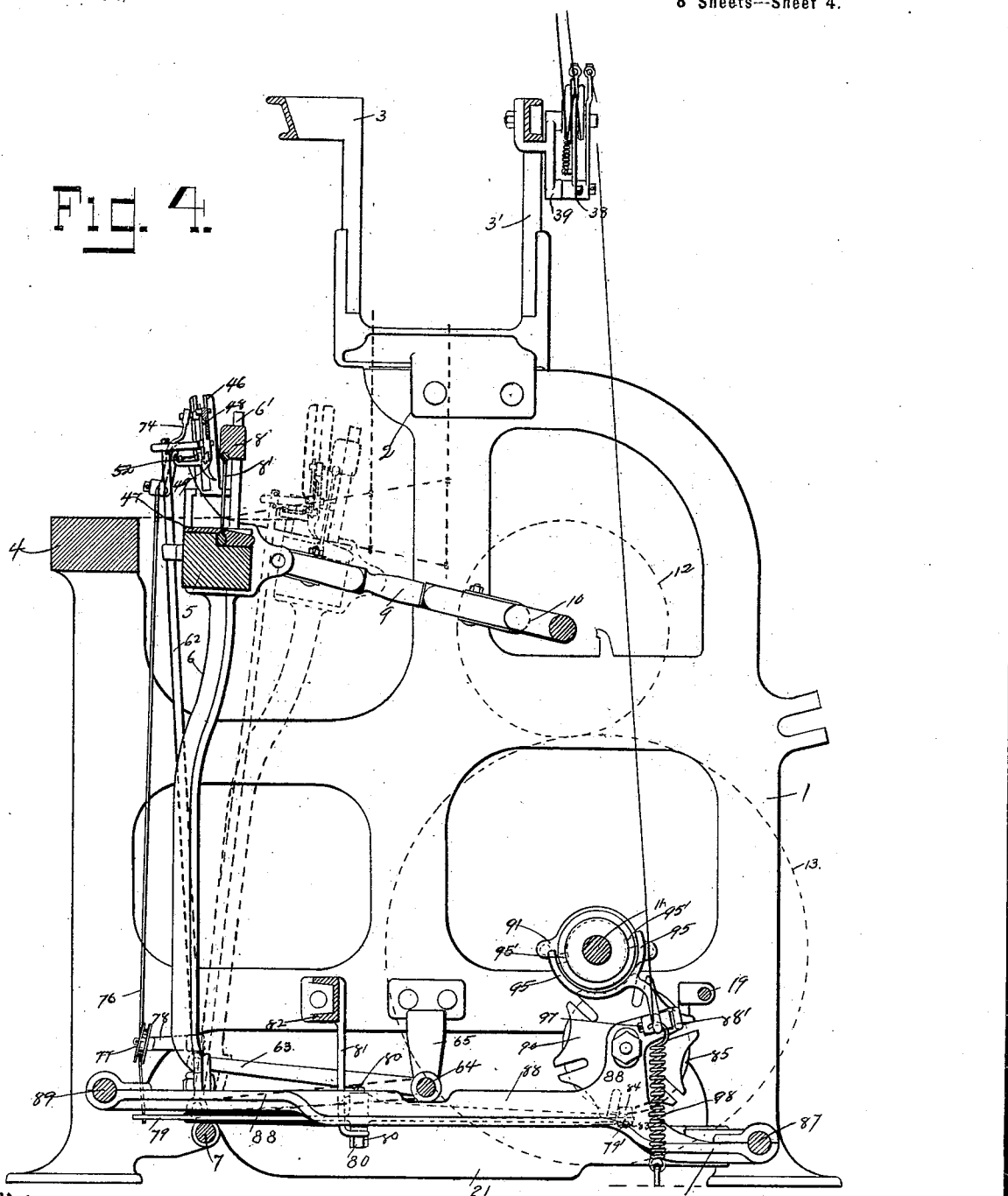

Referring to the drawings, Figure 1 is a rear view of the sliding pick mechanism which controls the action of the fly-shuttle mechanism and also shows a portion of my improvements combined with said sliding pick mechanism. The other parts of the loom are not shown in this figure. Fig. 2 shows a side view of the left-hand frame shown in Fig. 1, looking in the direction of arrow $a$, Fig. 1, and mechanism for regulating the operation of the sliding rods of the sliding pick mechanism shown in Fig. 1, which mechanism (shown in Fig. 2) is not shown in said Fig. 1. Fig. 2$^a$ shows the opposite position of the indicator-lever and cam-fingers shown in Fig. 2. Fig. 3 is a vertical section through the loom, taken at a point indicated by line 3 3, Fig. 1, looking in the direction of arrow $a$, same figure, showing the lay-sword, the lay, and some other parts which are not shown in Fig. 1. Some of the parts shown in Fig. 1 are not shown in this figure. Fig. 4 is a central vertical section through the loom, taken at a point indicated by line 4 4, Fig. 1, looking in the direction of arrow $a$, same figure. The lay-sword, lay, and other parts not shown in Fig. 1 are shown in this figure and the opposite position of the lay and parts supported thereon are shown by broken lines. Fig. 5 is a longitudinal section through the loom, taken at a point indicated by line 5 5, Fig. 3, looking in the direction of arrow $b$, same figure. Some of the parts are not shown in this figure. Fig. 6 is a cross-section through the lay, reed, and hand-rail and the swivel-shuttle attachment, taken at a point indicated by line 6 6, Fig. 5, looking in the direction of arrow $c$, same figure. The swivel-shuttle mechanism is shown in its lowered position. Fig. 6$^a$ shows a sectional view of the pin 55 and some of the parts connected therewith shown in Fig. 6. Fig. 7 is a front view of the swivel-shuttle mechanism, looking in the direction of arrow $d$, Fig. 6. Fig. 8 corresponds to Fig. 7, but shows the shuttles moved over into their opposite positions. The broken lines in Figs. 7 and 8 show the position of the shuttle-operating levers when the shuttles are moved down into the shed. Fig. 9 corresponds to Fig. 6, but shows a modified construction of the swivel-shuttle mechanism. Fig. 10 is a sectional view of the swivel-shuttle shown in Fig. 6 and of the bobbin or spool. Fig. 11 shows a modified construction of the shuttle shown in Fig. 10. Fig. 12 is a detached view of the lever mechanism controlled by the jacquard shown at the left in Fig. 1. Fig. 13 shows the opposite side of the mechanism shown in Fig. 12, with the support broken away. Fig. 14 is a detached plan view of the mechanism shown in Fig. 2. Fig. 15 shows the opposite position of parts of said mechanism, as shown in Fig. 2$^a$. Fig. 16 is a detached view of the lever mechanism shown at the right in Fig. 1, showing the opposite side of said mechanism. Fig. 17 is a perspective view of the cam-pulley shown in Fig. 1; and Fig. 18 is a detached section of said cam-pulley, showing the cam-surface thereon extending in a horizontal plane. Figs. 6 to 18, inclusive, are shown on an enlarged scale.

In the accompanying drawings, 1 designates the loom sides or frames; 2, the arch-stands; 3, the front arch; 3', the back arch; 4, the breast-beam; 5, the lay; 6, the lay-swords, pivotally mounted at their lower ends on the shaft 7 and having the upwardly-extending lay-sword horns 6', to which is bolted the hand-rail 8.

8' is the reed.

9 are the crank-connectors which connect the lay 5 with the crank-shaft 10.

11 is the bottom or driver shaft, which is geared to the crank-shaft 10 through gears 12 and 13, as shown by broken lines, Figs. 2, 3, and 4.

14 is the picking-shaft, which extends at right angles to the bottom shaft 11 and carries the picking-shoe 15, which is operated upon by the rolls 16, carried by the arms or castings 17 on the bottom shaft 11.

All of the above parts may be of the ordinary construction.

The sliding pick mechanism for controlling the action of the fly-shuttle-operating mechanism may be of any well-known construction; but I have shown in the drawings a sliding pick mechanism of substantially the same construction and operation as is shown in my Patent No. 474,170, above referred to. Therefore it is only necessary to briefly describe the same herein. Said sliding pick mechanism consists of two sliding rods 18 and 19, supported and sliding at their inner ends in a stand 20, secured to the lower cross-girt 21 and at their outer ends in the loom sides. The inner ends of the rods 18 and 19 are connected by curved arms 22 to a lever 23, centrally pivoted on the stand 20, so that said rods are caused to move simultaneously in opposite directions. Each rod 18 and 19 has a forked arm or yoke 24 secured thereto, which engages with the grooved hub 17' of the arm or casting 17, carrying the rolls 16. The castings or arms 17 are mounted on the bottom shaft 11 to slide thereon and to revolve therewith and to be moved into or out of engagement with the picking-shoes 15, according to the movement of the sliding rods 18 and 19. (See Fig. 1.)

The movement of the sliding rods 18 and 19 is controlled from the jacquard (not shown) through intervening mechanism, which is shown more particularly in Figs. 2, 2$^a$, 14, and 15. Referring to said figures, 25 is a longitudinal sliding arm or lever supported and sliding at its outer end in a box or stand 26, bolted to the loom side and supported at its inner end on the bottom shaft 11, which extends through a slot 25' in said lever 25, which is on the outside of the loom side. A spring 26' acts on the end of the lever 25 to hold it in position.

The bottom shaft 11 has a cam 27 fast thereon, which as the shaft revolves is brought into engagement with a finger 28, pivoted on the inner end of the arm 25 in the path of said cam 27 or with the finger 29 pivoted upon the arm 25 on the opposite side of the shaft and in the path of the cam 27 to move the arm 25 in one direction or the other, according as the indicator-lever 30, pivoted at one end on the arm 25, is raised or lowered by the cord 31, as shown in Figs. 2 and 2$^a$.

A pin or stud 32 on the outer end of the sliding rod 19 extends into a diagonal slot 25'' in the arm 25, (see Figs. 14 and 15,) so that the longitudinal motion of the arm 25, according as the finger 28 or finger 29 is moved into the path of the cam 27, communicates a sliding motion to the sliding rod 19 and also to the sliding rod 18 to move the picking-rolls 16 out of engagement with the picking-shoe 15 to stop the action of the fly-shuttle mechanism or into engagement with the picking-shoe to operate the fly-shuttle mechanism, according to the indications of the jacquard.

The cord 31 is connected, through a spring 33, with the angle-lever 34, pivoted on a stand 35, secured to the back arch 3'. (See Figs. 1 and 2.) A cord 36 connects the upper arm of the lever 34 with the lever 37, pivotally supported at its lower end on a stud 38 in an arm or bracket 39, secured to the rear arch 3'. (See Fig. 4.) The arm 39 has a stud 40 extending out therefrom, on which is loosely mounted a cam 41, having the two outwardly and downwardly extending arms 41'. The stud 40 extends through a horizontal slot 37' in the arm 37, and at each end of said slot, on the arm 37, are studs or pins 42, which extend out therefrom and are adapted to be engaged by the cam 41 to move the lever 37 in one direction or the other and through cord 36, lever 34, and cord 31 raise or lower the indicator-lever 30.

The cam 41 is so shaped and pivotally supported with reference to the stud 40 on the lever 39 that when it is moved to one extreme position or the other on its pivotal support, as shown in Figs. 12 and 13, it is locked in this position until the connection to the jacquard moves it in the opposite direction, thus preventing the accidental movement of said cam. In addition to this locking construction of the cam 41 I may employ the additional locking device shown in Figs. 12 and 13, which consists of a lever 43, centrally pivoted on the upper central part of the cam 41 and having curved arms connected at their outer ends by springs 44 to the lever 37, so that the cam 41, moving in either direction beyond its center, as shown in Figs. 12 and 13, is held or locked in this position by means of the springs 44, in connection with the arms 43. The cam 41 is rocked on its pivotal support in one direction or the other to move the lever 37 by cords 45, leading to the jacquard. (Not shown.)

I will now proceed to describe the swivel-shuttle mechanism and the operating mechanism therefor shown in the drawings.

At each end of the lay is secured an upright slotted stand 46, (see Fig. 3,) in which is mounted or held to have an up or down motion in front of the reed and over the race-plate 47 on the lay a transverse bar 48, carrying the downwardly-extending fingers 49, secured at their upper ends in this instance by screws 50 upon the front of said bar, as shown in Figs. 7 and 8, and having their lower ends 49' preferably curved inwardly, as shown in Figs. 6 and 10.

The fingers 49 have transverse grooves 51, with undercut edges in their front surfaces at the lower part thereof, into which extend and are supported the inner ends of the swivel-shuttles 52, which extend out from the fingers 49 in a horizontal plane and are preferably made of the shape shown in Figs. 6 and 10, being open on their upper side to receive the spool 53, on which the thread is wound and through which a central spring-spindle 53' extends to form a support for said spool to turn on, a tension device 53'', as shown in Fig. 10, being used to keep the proper tension on the thread.

I may use a swivel-shuttle of the description shown in Fig. 11, in which the spool 53 is supported independently of the shuttle 52 in a removable holder 52', preferably made of metal and of the shape shown. The holder 52' extends in two vertical grooves or recesses in the shuttle-body and is held therein. The advantage of the holder 52' for the spool 53 is that the spring-spindle 53' can be properly adjusted when the spool is placed in the holder 52' and does not require any further adjustment when the holder is placed in the shuttle 52. The holder 52' has an opening 52'' through its upper surface, through which the thread is passed from the spool 53. (See Fig. 11.)

The swivel-shuttles 52 are adapted to be moved back and forth from one finger 49 to the adjoining finger to carry the shuttle under and over the warp-threads which extend in the space between two of the fingers 49 and are called by the jacquard. The pointed ends 49' of the fingers 49 are arranged to extend in the front of a dent in the reed and in descending into the shed divides the warp-threads and pushes the different sets of warp-threads into the spaces between the fingers, so that the whole width of the fabric or any desired width thereof may have a figure or figures woven thereon by the swivel-shuttles at any point desired. Where the figures are not to be woven, the jacquard does not call the warp-threads for the swivel-shutters, and they therefore act as dead-shuttles.

The swivel-shuttles 52 are moved transversely from one finger to the adjoining finger and back, in this instance by means of levers 54, which are operated automatically in the manner to be hereinafter described and which are pivoted on the fingers 49 by pins or studs 54' and are adapted to engage with their lower pointed ends the necks of the swivel-shuttles to move them in one direction or the other, according to the movement of the levers 54.

There is a lever 54 for each swivel-shuttle 52 and one additional lever at the end of the series of levers. The upper end of each lever 54 extends loosely through a hole or opening in the head of the pins or studs 55, mounted to oscillate or turn in the sliding bar 56. Said heads extend out from the front side of said bar, and a transverse pin 55' (see Fig. 6ª) serves to retain the studs in the bar.

The sliding bar 56 is mounted to slide longitudinally on the upper grooved edge of the bar 48, (see Fig. 6,) and motion is communicated to slide said bar 56 in one direction or the other to move the levers 54 and through said levers move the swivel-shuttles 52 from one finger to the adjoining finger by mechanism to be hereinafter described.

Each swivel-shuttle 52 is held in the transverse groove 51 in the finger 49 to prevent its accidentally sliding out of position, in this instance by a ball 57, held in an opening in the finger 49 and pressed into a depression in the inner end of the neck of the shuttle by a spring 58, secured by a screw 59 to the finger 49, as shown in Fig. 10.

Instead of using the swivel-shuttle 52 of the shape and construction shown in Figs. 6 and 10 I may use a swivel-shuttle 60 of the shape and construction shown in Fig. 9, and instead of using a ball 57 to hold the shuttle in position I may use a spring-actuated plunger 61 (shown in said Fig. 9) or any other suitable device.

I will now describe the mechanism for automatically lowering and raising the swivel-shuttle mechanism—that is, the bar 48 and the sliding bar 56 and the parts supported thereon—so that the swivel-shuttles will be lowered into the shed, as shown in Fig. 6, and raised out of the shed in the operation of weaving the figures on the under side of or on both sides of the fabric woven in the loom by the ordinary fly-shuttle mechanism. (Not shown.)

To each end of the bar 48, carrying the fingers 49, supporting the swivel-shuttles 52, is secured the upper end of an upright rod 62. Each rod 62 has a vertical motion, and one of said rods 62 is pivotally attached to the front end of a lever 63, (see Fig. 4,) secured at its inner end on a rock-shaft 64, mounted in hangers 65, secured to the loom sides. The lower end of the other rod 62 is pivotally secured to the front end of the lever 66, centrally secured on the rock-shaft 64. (See Fig. 3.) The other end of the lever 66 carries a roll mounted on a stud 67 in said lever, and a cam 68, fast on the bottom shaft 11, engages said roll to communicate motion to the lever 66 and through rock-shaft 64 to the lever 63 to raise the rods 62 at the proper time and with them the swivel-shuttle bar. As the cam 68 revolves the weight of the swivel-shuttle bar causes it to be lowered to carry the swivel-shuttles into the shed and keeps the roll on the lever 66 in engagement with the cam 68. A spring or other means may be used to keep the roll in engagement with the cam, if preferred.

The rear end 66' of the lever 66 extends beyond the roll on said lever engaged by the cam 68 toward the back of the loom (see Fig. 3) and is adapted to be engaged when the swivel-shuttle mechanism is raised out of the shed and the fly-shuttle mechanism is in operation, to avoid any possibility of the swivel-shuttles and fly-shuttle coming in contact with each other, by one arm 69' of an angle-lever 69, which is pivoted on a stud 70, fast in the upper end of a stand 71, secured to the loom side. (See Figs. 1 and 3.) The opposite arm of the angle-lever 69 is provided with a stud or pin 72, which extends into a slot 73' in the arm 73, fast on the sliding rod 19. (See Fig. 1.) It will thus be seen that when the sliding rod 19 is moved to the left to bring the picking-rolls 16 into position to engage the picking-shoes, as shown by dotted lines in said figure, then through the arm 73 the angle-lever 69 will be rocked to move down the arm 69' thereof and cause it to extend over the end 66' of the lever 66, preventing said lever from moving as long as the fly-shuttle mechanism is in operation. When the picking-rolls 16 are moved in the opposite direction to throw out of action the fly-shuttle mechanism, the angle-lever 69 through arm 73 will be moved and the arm 69' thereof raised, as shown in Fig. 1, to allow the lever 69 to move and the swivel-shuttles to be lowered into the shed.

I will now describe the mechanism for communicating a longitudinal motion to the sliding bar 56 and through levers 54 to move the swivel-shuttles 52 from one finger to an adjoining finger after they are lowered into the shed or raised out of the shed.

To each end of the sliding bar 56 is connected the upper end of an angle-lever 74, which is pivoted in this instance in the lower end of an arm 75, secured to the bar 48, carrying the fingers 49. The other arm of the angle-lever 74 is connected by a cord 76, which passes over a pulley 77, mounted in an arm 78, secured on the upright rod 62. (See Fig. 5.) The inner ends of the cords 76 are secured to the front ends of a lever 79, which is pivotally supported at its central portion to swing in a horizontal plane on a stud 80, secured in the lower end of a hanger 81, secured to a cross-girth 82 on the loom-frame. (See Figs. 3 and 4.)

The inner end 79' of the lever 79 is provided with a stud 83, on which is mounted a roll 84, (see Figs. 1 and 4,) which extends into and travels in a cam-groove 85', cut in the periphery of a drum 85. Said drum 85 is fast on a stud or shaft 86, mounted in an arm extending up from a girth 88, which extends between the rear cross-rod 87 and the front rod 89. (See Figs. 3 and 4.)

Fast on the hub of drum 85 is a star-wheel 90, which is operated by a pin-wheel 91, keyed on a sleeve 92, secured to the bottom shaft 11 by a bolt 93, extending in a collar or head 94 on one end of the sleeve 92. (See Fig. 1.) The pin-wheel 91 is caused to slide on the bottom shaft 11 to move into and out of engagement with the star-wheel 90 by a two-armed lever or yoke 95, provided with pins or studs 95', extending into an annular groove 96' in a pulley 96, forming a part of the pin-wheel 91. The lever 95 is pivotally supported on a stud 97, secured in a side extension 88' on the girth 88, (see Figs. 1 and 4,) and has an arm 95'' extending out therefrom, to the outer end of which is attached one end of a spiral spring 98. The other end of the spring 98 is in this instance secured to the floor. To the arm 95'' is also attached the lower end of a cord 99, which leads over a pulley 100, supported in this instance on the back arch 3'. The other end of the cord 99 is attached to the rocking lever 37, (see Fig. 1,) said lever, the cam 41, and the other parts connected therewith being of substantially the same construction and operation as the lever 37 and the parts connected therewith, (shown at the left in Fig. 1,) which have been already described, and similar figures are used to represent similar parts. The additional locking mechanism shown at the left in Fig. 1 is not shown in connection with the oscillating-lever mechanism shown at the right in Fig. 1, and also shown in Fig. 16, and only one locking stud or pin 42 is shown, the spring 98 acting on cord 99 to hold the cam 41 in its opposite position. Cords 45' lead to the jacquard mechanism. (Not shown.) It will thus be seen that the engagement of the pin-wheel 91 with the star-wheel 90 to operate the drum 85 through lever 79 and communicate a longitudinal motion to the sliding bar 56 to move the swivel-shuttles is controlled by the jacquard. The movement of the left-hand jacquard-cord 45' (see Fig. 1) acts to move the rocking lever 37 to the right and through cord 99 and lever 95 moves the pin-wheel 91 into engagement with the star-wheel 90, as shown in Fig. 1, and thus communicates to the drum 85 an intermittent motion and in this instance one-sixth of a revolution. The movement of the right-hand jacquard-cord 45' will move the rocking lever 37 in the opposite direction to the left and allow the spring 98 to act to move the pin-wheel 91 out of engagement with the star-wheel 90 and leave the star-wheel 90 and the drum 85 at rest.

The cam-groove 85' in the drum 85 is of such shape that a one-sixth revolution of said drum, which is communicated to it at each engagement of the pin-wheel 91 with the star-wheel 90, will move the levers 54, which operate the swivel-shuttles 52, from the position shown in full lines, Fig. 7, to the position shown in full lines, Fig. 8, and then to the position shown by dotted lines, Fig. 8, so as to move the lower ends of the levers 54 out of the spaces between the swivel-shuttles and fingers to allow the shuttles and fingers to go down into the shed and the warp-threads to pass up between the same without engaging with the lower ends of the levers 54.

Referring to Fig. 18, which shows in plan the cam-groove 85' in the drum 85, (shown in Fig. 17,) supposing the drum 85 to be revolving in the direction of arrow $f$, the long portion of the cam-groove (marked $x$) will carry the roll 84 (shown in said Fig. 18) from the position $v$ to the position $w$. This will shift the levers 54, through the lever 79, cords 76, angle-lever 74, and sliding bar 56, from the position shown in Fig. 7 to the position shown in Fig. 8. The cam portion $y$ in the continued revolution of the drum 85 will carry the roll 84 to the position $o$ and will move back the levers 54 from the position shown by full lines, Fig. 8, to the position shown by dotted lines, Fig. 8, and during the intermission of the movement of the drum the swivel-shuttles may be lowered into the shed, for example, and after they are lowered into the shed the drum 85 being again put into operation the long cam portion $z$ will carry the roll 84 to the position $n$ and will move the levers 54 from the position shown by dotted lines, Fig. 8, to the position shown by full lines, Fig. 7. The continued revolution of the drum 85 will cause the short cam portion $m$ to move the roll 84 to the position $v$ and the levers 54 from the position shown by full lines, Fig. 7, to the position shown by dotted lines, same figure, and then the movement above described will be repeated.

It is necessary to have the drum 85 provided with a cam-groove of such shape that the levers 54 will be moved to throw the swivel-shuttles in one direction and then the levers partially moved back to leave a clear space for the warp-threads to pass up between the swivel-shuttles and their supporting-fingers, as above described.

The connection of the pin-wheel or other mechanism for operating the drum 85 with the jacquard controls the movement of the swivel-shuttles from the jacquard to weave the spot or figure on the under side of the fabric.

From the above description, in connection with the drawings, the operation of my improvements in swivel-looms will be readily understood by those skilled in the art.

Supposing the fly-shuttle-operating mechanism is out of operation, as shown in Fig. 1, and the swivel-shuttles have been lowered into the shed, as shown in Fig. 6, and the pin-wheel 91 has been moved ready to engage the star-wheel 90, upon engagement of the pin-wheel with the star-wheel a one-sixth revolution is communicated to the drum 85 and the swivel-shuttles 52 are shifted, as above described—for instance, from the position shown in Fig. 7 to the position shown in Fig. 8—to carry the embroidering-thread under whatever threads are raised between the different spaces between the swivel-shuttles and their supporting-fingers. The disengagement of the pin-wheel 91 from the star-wheel 90 leaves the star-wheel and drum 85 at rest, and the revolution of the cam 68, fast on the bottom shaft 11, (see Fig. 3,) through lever 66 and lever 63, raises the rods 62, and with them the bar 48, carrying the swivel-shuttles and their supporting-fingers out of the shed. While the swivel-shuttles are being raised out of the shed the jacquard, through connections therewith, operates the fly-shuttle sliding pick mechanism, so that the fly-shuttle will operate to put in the filling. In case the swivel-shuttle mechanism is to continue to operate the picking-rolls are moved, through the jacquard, to stop the operation of the fly-shuttle mechanism, and the continued revolution of the cam 68 brings the lower part of said cam over the roll on the lever 66 and allows the front end of said lever 66 and of the lever 63 to be lowered to carry down the rods 62 and the bar 48 to again bring the swivel-shuttles into the shed. Through the jacquard the pin-wheel 91 is again moved into engagement with the star-wheel 90 and gives to the drum 85 another partial revolution, which shifts the swivel-shuttles from the position shown in Fig. 8 to the position shown in Fig. 7, and they are then raised out of the shed and the filling put in, as above described.

In case there is to be plain weaving between the spots or figures then, through connections to the jacquard, the pin-wheel 91 will be held out of engagement with the star-wheel 90 for the number of picks of plain weaving which are to be put in, and at the same time the jacquard will act to hold the picking-rolls in contact with the picking-shoes of the fly-shuttle mechanism.

It will be understood that the details of construction of the several parts of my loom may be varied, if desired.

Having thus described my invention, what I claim as new, and desire to secure by Letters Patent, is—

1. In a swivel-shuttle loom, the combination with a series of fingers, and swivel-shuttles supported thereon, and a locking device for retaining the swivel-shuttles in place upon the fingers, and levers pivoted on said fingers, to move said swivel-shuttles, of mechanism for automatically moving said levers in one direction, and then partially moving them in the opposite direction, to move them out of the space between the fingers, said mechanism consisting of a cam-surface, or drum, and intervening connections to said levers, substantially as shown and described.

2. In a swivel-shuttle loom, the combination with a series of fingers, and swivel-shuttles supported thereon, and levers pivoted on said fingers to move said swivel-shuttles, of mechanism for automatically moving said levers to move the shuttles from one finger to an adjoining finger, and a locking device for retaining the swivel-shuttles in place upon the fingers, comprising a spring-actuated ball supported in an opening in said finger and extending into a recess in the inner end of the swivel-shuttle, substantially as shown and described.

3. The combination with a series of fingers, and swivel-shuttles supported thereon, and levers pivoted on said fingers to move said swivel-shuttles, of mechanism for automatically moving said levers in one direction, and then partially moving them in the opposite direction to move them out of the space between the fingers, said mechanism consisting of a cam-surface, or drum and intervening connections to said levers, substantially as shown and described.

4. In the mechanism connected with the jacquard-cords, the combination with an arm having a stud thereon, a cam supported on said stud to have an oscillating motion, and having two oppositely-extending arms to which the cords leading to the jacquard are attached, a lever centrally pivoted on said cam and having oppositely-extending arms connected by springs to a lever, pivotally supported on said arm and having a slot therein through which the stud on said arm extends, and said pivotally-supported lever and a stud or pin on said lever to be engaged by said cam to move said lever according to the indications of the jacquard, said cam being locked at the extreme position of its movements, substantially as shown and described.

GEORGE F. HUTCHINS.

Witnesses:
J. C. DEWEY,
M. J. GALVIN.